Figure 2:
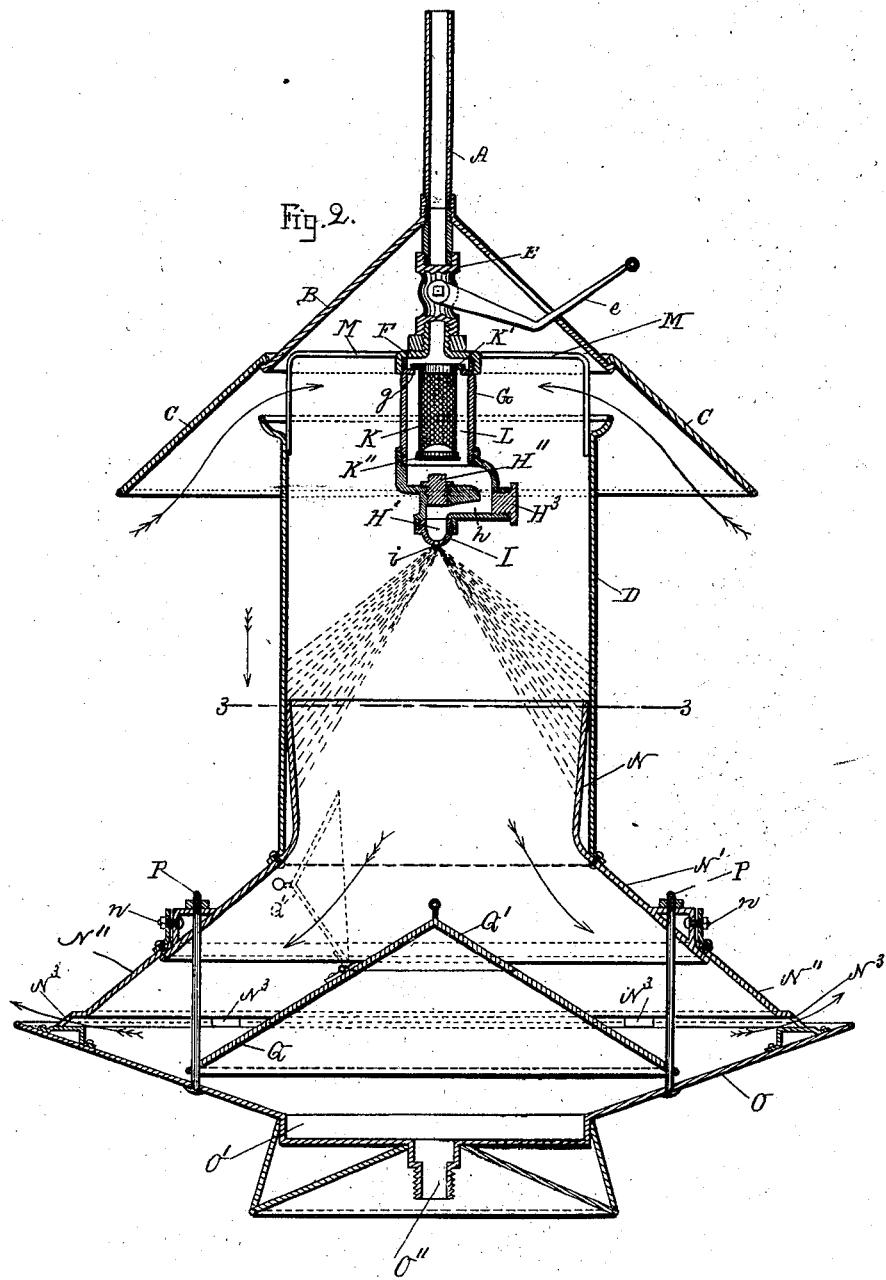

No. 665,224. Patented Jan. 1, 1901.
T. JOHANNIS.
HUMIDIFIER.
(Application filed Sept. 17, 1900.)
(No Model.) 3 Sheets—Sheet 1.
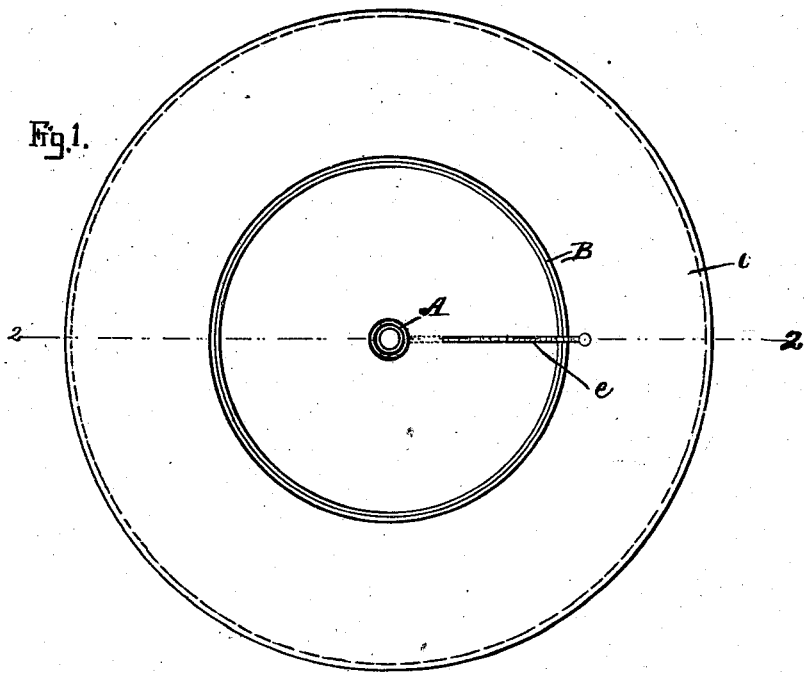
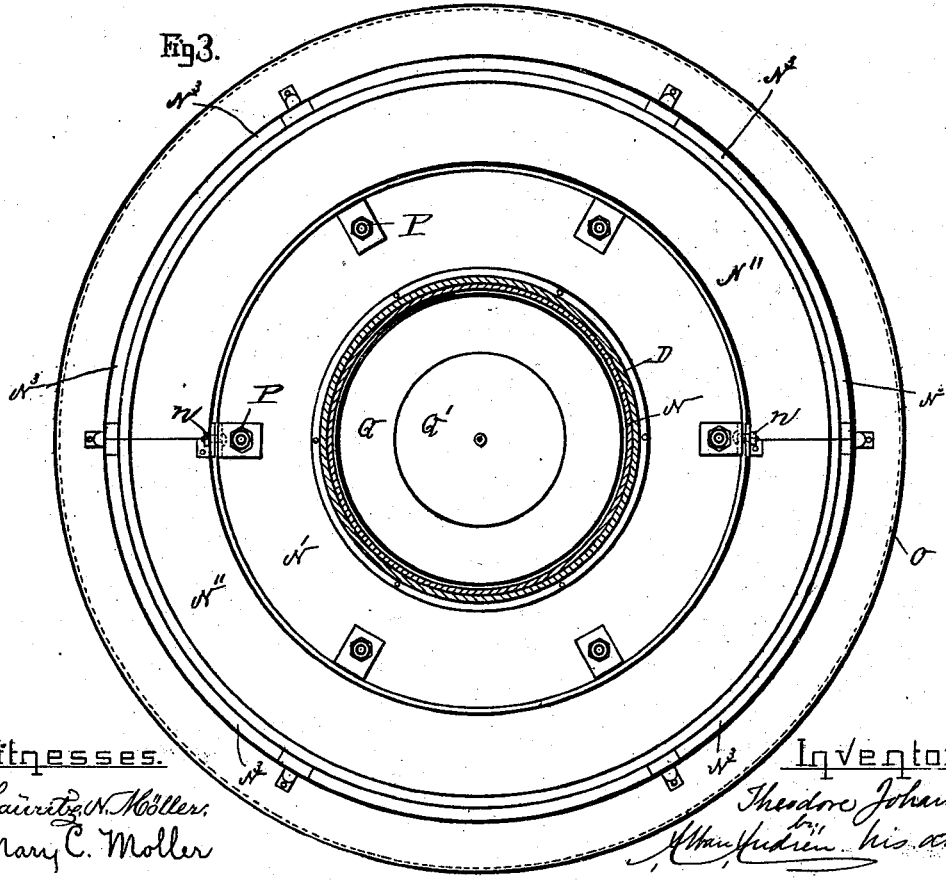
Witnesses. Inventor.
Lauritz N. Möller. Theodore Johannis.
Mary C. Moller. by his atty.

No. 665,224. Patented Jan. 1, 1901.
T. JOHANNIS.
HUMIDIFIER.
(Application filed Sept. 17, 1900.)

(No Model.) 3 Sheets—Sheet 2.

Witnesses.
Lauritz N. Möller
Mary C. Moller.

Inventor.
Theodore Johannis
by Alban Andrew
his atty.

No. 665,224. Patented Jan. 1, 1901.
T. JOHANNIS.
HUMIDIFIER.
(Application filed Sept. 17, 1900.)
(No Model.) 3 Sheets—Sheet 3.
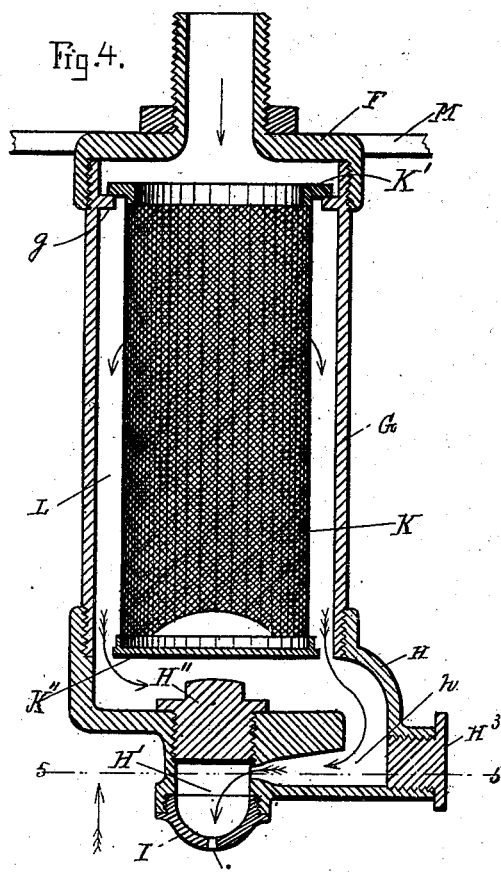
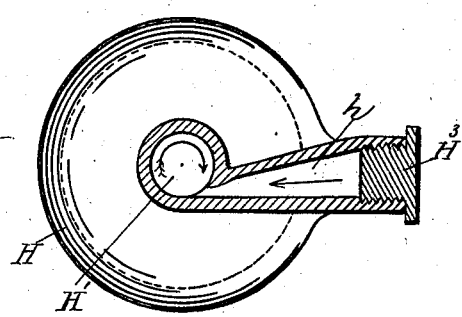
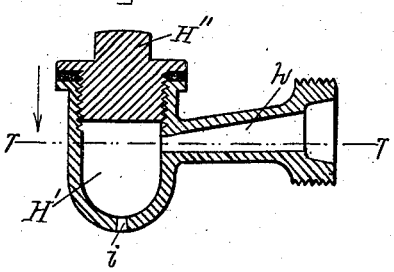
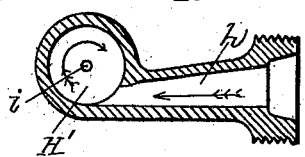
Witnesses.
Lauritz N. Möller
Mary C. Moller
Inventor.
Theodore Johannis
by Alban Andrew
his atty.

UNITED STATES PATENT OFFICE.

THEODORE JOHANNIS, OF CHELSEA, MASSACHUSETTS, ASSIGNOR OF ONE-HALF TO RICHARD C. ULBRICH, OF SAME PLACE.

HUMIDIFIER.

SPECIFICATION forming part of Letters Patent No. 665,224, dated January 1, 1901.

Application filed September 17, 1900. Serial No. 30,246. (No model.)

*To all whom it may concern:*

Be it known that I, THEODORE JOHANNIS, a citizen of the United States, residing at Chelsea, in the county of Suffolk and State of Massachusetts, have invented new and useful Improvements in Humidifiers, of which the following is a specification.

This invention relates to improvements in humidifiers for humidifying the air in factories and other inclosed places where humidity and moisture are required; and it is carried out as follows, reference being had to the accompanying drawings, wherein—

Figure 1 represents a top plan view of my improved humidifier. Fig. 2 represents a vertical section on the line 2 2, shown in Fig. 1. Fig. 3 represents a cross-section on the line 3 3, shown in Fig. 2. Fig. 4 represents an enlarged detail vertical section of the spraying device. Fig. 5 represents a horizontal section on the line 5 5, shown in Fig. 4. Fig. 6 represents a sectional view of a modification of the spraying-nozzle, and Fig. 7 represents a horizontal section on the line 7 7, shown in Fig. 6.

Similar letters refer to similar parts wherever they occur on the different parts of the drawings.

In the drawings, A represents the water-supply pipe, leading from any desired source of water-pressure, and to the lower end of such pipe is secured a preferably conical hood B, on the outer edge of which is loosely supported a supplementary hood C, capable of being elevated to permit of access to the spraying device for cleaning purposes, such hoods serving as a means for preventing dust, &c., from entering the humidifier casing or cylinder D.

On the water-supply pipe A is arranged a valve E, to the plug of which is attached a handle or lever $e$, by means of which the supply of water to the spraying device may be regulated.

The spraying device consists of a cap or head F, secured to the lower end of the water-supply pipe A, and to such cap or head is attached a cylinder G, the lower end of which is secured to a chambered head H, having a conduit $h$, leading to the nozzle-chamber H', which is closed at its lower end by means of the removable nozzle I, provided with a spraying perforation $i$, as shown in Figs. 2 and 4.

H" and H³ are screw-threaded removable caps on the chamber H, which may be removed for the purpose of cleaning the lower portion of the spraying device, as may be needed from time to time.

The conduit $h$ terminates at its inner end tangentially relative to the nozzle-chamber H', so as to cause the moisture or spray from the filter-cylinder K to assume a rotary motion, and thus become subdivided before passing out through the orifice $i$.

Within the cylinder G is located a filter-cylinder K, preferably made of wire gauze or netting and having attached to its upper end an annular ring K', resting on a shoulder $g$ at the upper end of the cylinder G, as shown in Figs. 2 and 4. To the lower end of the perforated filter K is secured a closed cap or head K", as shown in said Figs. 2 and 4.

L is an annular space between the exterior of the spraying-cylinder K and interior of the casing G, as shown.

M is a cross-bar or horizontal brace secured to the upper open end of the humidifier-casing D and to the cap F of the spraying device, as shown in Figs. 2 and 4.

Within the lower end of the casing D is secured an annular conical shield N, provided with an outwardly-flaring annular flange N', to which is pivoted at $n$ $n$ the semicircular flaring flange extensions N" N", as shown in Figs. 2 and 3. Below the flaring flange extensions N" N" is located the conical dish-pan O, which is preferably secured to the flaring flange N' by means of screw-bolts P P. (Shown in Figs. 2 and 3.) The lower central portion of the pan O terminates as a sunken drip-pan O', from which leads a delivery-pipe O" in the ordinary manner, as shown in Fig. 2. Between the lower edge of the flange extension N" N" and the upper portion of the dish-pan O are arranged a series of openings N³ N³, through which the spray of water is ejected from the humidifier into the room the air of which is to be moistened.

Within the lower portion of the device is arranged a conical deflector Q, provided with a hinged top Q', which latter may be swung to the position shown by dotted lines in Fig. 2 whenever it is desired to clean the chamber below the conical deflector or conducting-cone Q and remove dust or other accumulations therefrom as may be needed. During such cleaning operation the semicircular conical flange extensions N″ N″ are swung upward on the pivot-bolts $n\,n$, thus permitting access to the lower portion of the humidifier above and below the conical deflector Q for the purpose stated.

In practice I prefer to make the humidifier as represented in detail in Figs. 4 and 5; but I do not desire to limit myself to such exact construction, as it may be made without a filter or cylinder, as shown in the modification represented in Figs. 6 and 7, so as to connect it with any other humidifier now in use.

The operation of the device is as follows: The water that is forced through the pipe A passes through the perforated cylinder K into the cylinder G and through the conduit $h$ into the chamber H', where it is caused to rotate before being forced out in the form of a spray through the orifice $i$. The spray thus forced out through said orifice $i$ strikes the conical shield N and rebounds against the conical deflector Q, causing the moisture to be still more and finely subdivided before being forced out through the openings $N^3$ into the room or factory, where a humidified atmosphere is desired.

During the operation of the device the air from the room, &c., is caused to enter the cylinder D between its upper end and the under side of the conical hoods B C, as shown by arrows in Fig. 2.

Having thus fully described the nature, construction, and operation of my invention, I wish to secure by Letters Patent and claim—

1. In a humidifying apparatus, a casing open at its upper end and provided with a humidifying device connected to a water-supply pipe, a hood connected to said pipe, a supplemental hood C loosely supported by said hood, said hoods adapted to prevent dust, &c., from entering said casing, a shield secured within said casing and projecting outwardly therefrom and a deflector connected to said shield and provided with a hinged top to permit of access to the interior of the casing.

2. In a humidifying apparatus, a cylinder, a cap secured to the upper end thereof and connected to a water-supply under pressure, a filter arranged in said cylinder, a perforated nozzle, a head H secured to said cylinder and nozzle and provided with a conduit arranged tangentially relative to said nozzle, and removable plugs suitably connected to the head H, substantially as described.

3. In a humidifying apparatus in combination a humidifying-casing open at its upper end a spraying device arranged therein, an inclined shield N arranged within the lower end of said casing, and having an outwardly-projecting annular flange N', a pair of semicircular hinged flange extensions N″, provided with a series of spray-openings, $N^3$, a dish-pan O permanently attached to the flange N', an internal conical deflector Q, having a hinged top Q' and a drain-pipe O″, leading from the lower portion of the pan O substantially as and for the purpose set forth.

4. In an apparatus of the class described, a casing, a humidifying device mounted therein and connected to a supply-pipe, a hood mounted above said casing and connected to said pipe, and a hood loosely mounted upon the first-named hood and capable of being vertically adjustable to permit of the cleaning of the humidifying device.

5. In an apparatus of the character described, a casing, a humidifying device mounted therein, an adjustable and a rigidly-secured hood mounted at the top of the casing, a shield secured to the lower end of said casing, flaring extensions pivotally connected to said shield, a pan secured to said shield and a drip-pan connected to said pan.

6. In an apparatus of the character described, a casing, a humidifying device mounted therein, connected to a water-supply pipe, a hood secured to said pipe, a supplemental hood loosely mounted upon said hood, a shield secured to the lower end of said casing, flaring extensions pivotally connected to said shield, a pan secured to said shield, a drip-pan connected to said pan, and a deflector suitably connected to said shield and provided with a hinged top.

In testimony whereof I have hereunto set my hand in presence of two subscribing witnesses.

THEODORE JOHANNIS.

Witnesses:
ALBAN ANDRÉN,
LAURITZ N. MÖLLER.